United States Patent [19]
Levy

[11] Patent Number: 4,893,968
[45] Date of Patent: Jan. 16, 1990

[54] END MILL

[76] Inventor: Zadok H. Levy, 114 Hagolan St., Tel-aviv, Israel

[21] Appl. No.: 168,153

[22] Filed: Mar. 15, 1988

[51] Int. Cl.$^4$ .............................................. B26D 1/12
[52] U.S. Cl. ...................................... 407/54; 407/57; 407/53
[58] Field of Search ...................... 407/54, 57, 59, 60, 407/61, 62, 63, 53

[56] References Cited
U.S. PATENT DOCUMENTS
2,113,178  4/1938  Gase ...................................... 407/54
4,712,948  12/1987  Kidani ................................... 407/54

Primary Examiner—Frederick R. Schmidt
Assistant Examiner—Lawrence Cruz
Attorney, Agent, or Firm—Orrin M. Haugen; Thomas J. Nikolai; Frederick W. Niebuhr

[57] ABSTRACT

An improved end mill which is less subject to breakage in that its helical flutes in the cutting protion are tapered in depth from a maximum proximate the cutting tip to a minimum proximate the transition to the end mill's shank portion.

8 Claims, 3 Drawing Sheets

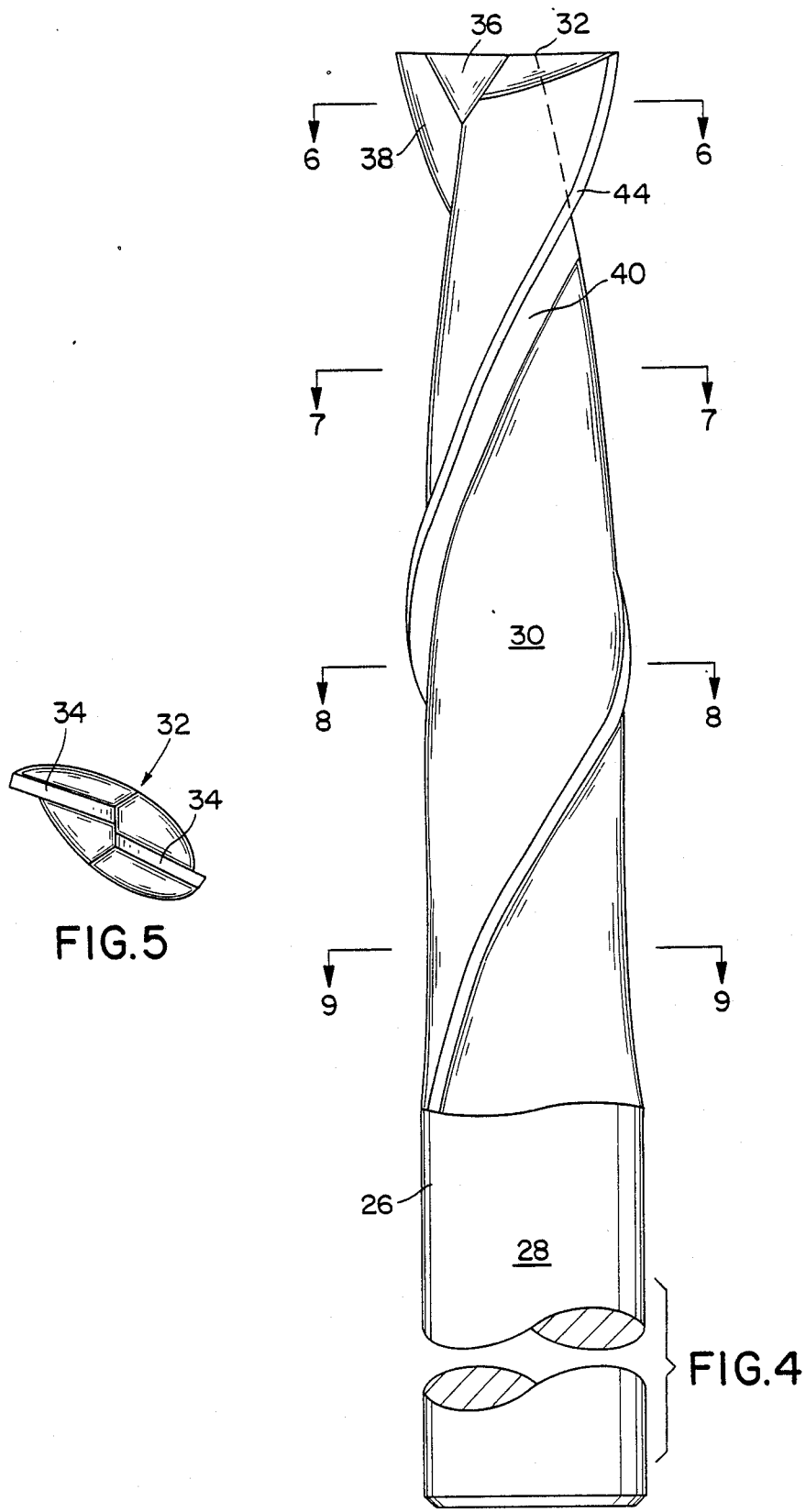
FIG.4
FIG.5
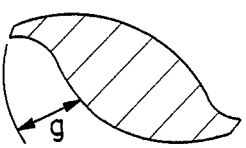
FIG.6
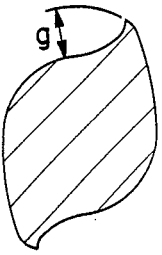
FIG.7
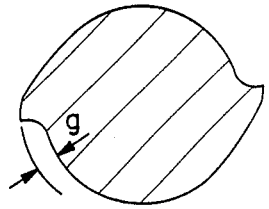
FIG.8
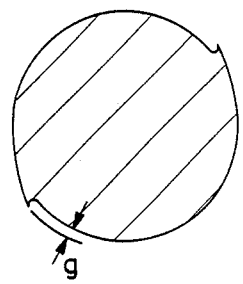
FIG.9

END MILL

BACKGROUND OF THE INVENTION

I. Field of the Invention:

This invention relates generally to milling machine apparatus and more particularly to an improved end mill for use in such milling machines.

II. Discussion of the Prior Art:

Prior art end mills generally comprise a hardened steel shank having one or more helical convolutions or flutes extending from the tip thereof for a predetermined distance, the shank also including a smooth cylindrical portion which is adapted to fit into the end mill holding chuck on the milling machine. The strength and rigidity of end mills are very important factors in the overall productivity of milling machines. In prior art end mills, the depth of grinding of the flutes is uniform along the length of the end mill. On one hand, it is desirable that this depth be as large as possible so as to allow the chips generated during the milling process to be removed from the end mill. On the other hand, the deeper they are, the weaker the end mill will be due to the decrease of cross-sectional area. It is also desirable that the flutes be as long as possible to allow milling to greater depths. Milling to a depth greater than the flute length can cause the chips that are being removed from the workpiece to rise up the flute and become trapped between the end mill and the wall in the workpiece surrounding the milled-out area. The longer the flute is, though, the weaker the end mill will be. Prior art end mills, with uniform depths of grinding, are designed by compromising these design considerations, depending upon the end use of the tool. It can be shown that end mill breakage tends to occur at the transition between the fluted portion of the end mill and the straight or smooth portion. This is due to the fact that the forces acting on the end mill, when being fed through the workpiece, results in an increasing stress along the length of the end mill at increasing distances from the cutting end, assuming an end mill of uniform cross-sectional area.

I have devised a way of fabricating an end mill which is much less subject to breakage as compared to known prior art end mills. This permits faster feed rates during the milling operation, resulting in increased production and at lower cost, not only because of the potential increase in parts per unit of time, but also because of the savings in the cost of the end mills themselves, which are less costly to produce due to the decrease in the amount of material which must be removed by grinding during their fabrication. Moreover, my end mill design produces workpieces with smoother machined surfaces due to the greater stability and less chatter of the end mill in the chuck and the greater effective flute length. Then, too, the end mill of the present application can be used for making both shallow and deeper cuts, thus reducing the usual inventory of end mills of different sizes and lengths.

OBJECTS

Accordingly it is a principal object of the present invention to provide a new and improved end mill for use in milling machine equipment.

Another object of the invention is to provide an improved end mill that is less subject to breakage than prior art end mills.

Yet another object of the invention is to provide an end mill having improved cutting characteristics.

Still another object of the invention is to provide an improved end mill exhibiting greater resistance to breakage, lower cost of manufacture and capable of being operated at higher feed rates as compared to the prior art.

SUMMARY OF THE INVENTION

The foregoing advantages are achieved in accordance with the present invention by providing an end mill which is specially ground so that the flutes thereof are no longer of uniform depth but, instead, vary in depth from a maximum at the working tip to a minimum proximate the transition to the smooth chuck receiving portion of the shank. Because the effective core diameter of the end mill is of increased dimension at the point of maximum stress, it is less subject to fracture as compared to prior art end mills. Moreover, the effective core diameter of my end mill is greater than in prior art end mills, which not only adds to its strength but also its effectiveness. That is, the greater core diameter makes it less flexible and therfore the surface being machined tends to be smoother than that which results when standard end mills are being utilized.

DESCRIPTION OF THE DRAWINGS

Additional features and advantages of the invention will become apparent to those skilled in the art from the following detailed description of a preferred embodiment, especially when considered in conjunction with the accompanying drawings in which like numerals in the several views refer to corresponding parts.

FIG. 4 is a side elevation of an end mill constructed in accordance with the present invention;

FIG. 5 is a tip end view of the end mill of FIG. 4;

FIG. 6 is a sectional view taken along the line 6—6 in FIG. 4;

FIG. 7 is a cross-sectional view taken along the line 7—7 in FIG. 4;

FIG. 8 is a cross-sectional view taken along the line 8—8 in FIG. 4;

FIG. 9 is a cross-sectional view taken along the line 9—9 in FIG. 4;

DESCRIPTION OF THE PREFERRED EMBODIMENT

Figure 2:
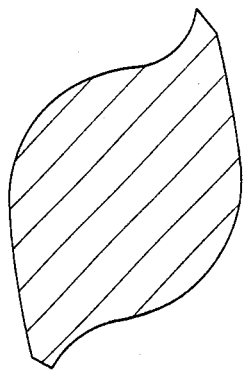
FIG. 2 is a sectional view taken along line 2—2 in FIG. 1.
Figure 3:
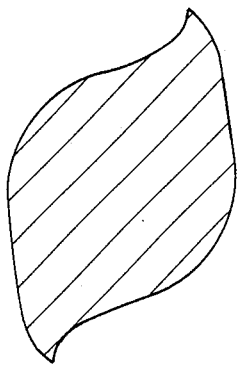
FIG. 3 is a sectional view taken along line 3—3 in FIG. 1.
Figure 1:
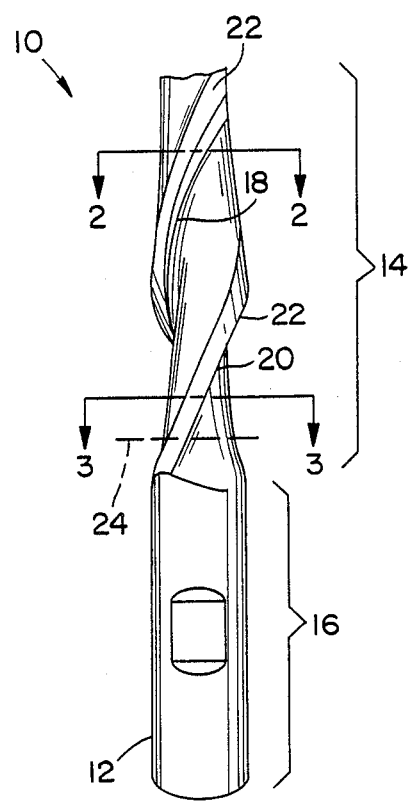
FIG. 1 is a side elevation of a prior art end mill.

Referring to FIGS. 1 through 3, there is shown a prior art end mill of the type commonly used in a milling machine. It is identified generally by numeral 10 and is seen to include a generally cylindrical hardened steel rod 12 having a cutting portion identified by brackets 14 and a shank portion encompassed by bracket 16. The shank portion 16 is adapted to be received within the chuck of a milling machine. The cutting portion 14 of the rod 12 is ground to define two or more helical flutes as at 18 and 20 which terminate in a radial cutting edge 22.

By referring to the cross-sectional views of FIGS. 2 and 3, it is to be noted that the depth of the helical flutes 18 and 20 remains uniform over the length of the cutting portion 14. These flutes provide the groove or passage through which metal chips developed during the milling process are carried out of the confines of the workpiece. These spiral flutes effectively reduce the cross-sectional area of the rod stock 12 from which the end mill is fabricated. It may also be shown that the lateral force acting on the end mill during the milling operation creates a stress which increases along the length of the tool. As such, there is a tendency for prior art end mills to fracture or shear along the dotted line 24 proximate the transition between the cutting portion 14 and the shank portion 16 where the stress is the greatest, especially at higher feed rates.

Referring next to the side view of FIG. 4 and the cross-sectional views of FIGS. 5 through 8, the end mill constructed in accordance with the present invention will next be described. Here again, it is seen to include a generally cylindrical, hardened steel rod 26 including integrally formed shank portion 28 and cutting portion 30. The portion 30 includes a sharpened cutting end 32 which is ground to create an end cutting edge 34 defined by end clearance 36 and a tooth face as at 38.

The side view of FIG. 4 also illustrates a plurality (two) of helical flutes 40 and 42 extending from the tip 32 to the shank portion 28 of the end mill. The edge of each flute is ground to define a radial cutting edge as at 44. As is evident from the cross-sectional views of FIGS. 5 through 8, the grinding depth, g, defining the flutes 40 and 42 is smoothly tapered, being a maximum depth proximate the tip end 32 of the end mill and a minimum depth proximate the shank portion 28 of the tool. Because the grinding depth, g, is not uniform, the end mill of the present invention has a larger effective diameter at the location where the breaking force on the tool is the greatest. As such, there is less tendency to break and it is possible to operate the milling machine at a faster feed rate utilizing the end mill of the present invention than can be utilized when the prior art end mill is employed. Moreover, less grinding is required in fabricating the end mill of the present invention in that a lesser amount of material need be removed in creating the flutes. This produces a lower production cost of the end mill and also less wear-and-tear on the grinding equipment used in fabricating the end mill.

In the embodiment of FIG. 4, the flute depth rather uniformly varies in a tapered fashion from its cutting tip 32 to the chuck-receiving shank 26. In the alternative embodiment of FIG. 10, the end mill is ground so that the flute depth varies more abruptly from a maximum depth proximate the cutting end 50 to a transition zone 52 where the flute depth is a minimum but then remains constant along the remaining fluted portion of the end mill up to the chuck-receiving shank 54. The length of the portion of maximum flute depth labeled L in FIG. 10 preferably is in the range of from one to one and one-half times the effective diameter of the end mill.

Because, as has already been mentioned, the stress increases along the length of the end mill reaching a maximum near the upper end of the grooved portion as at 56, the fact that the flute depth is significantly greater near the tip does not result in a tendency towards tool breakage in that portion of the end mill.

Figure 10:
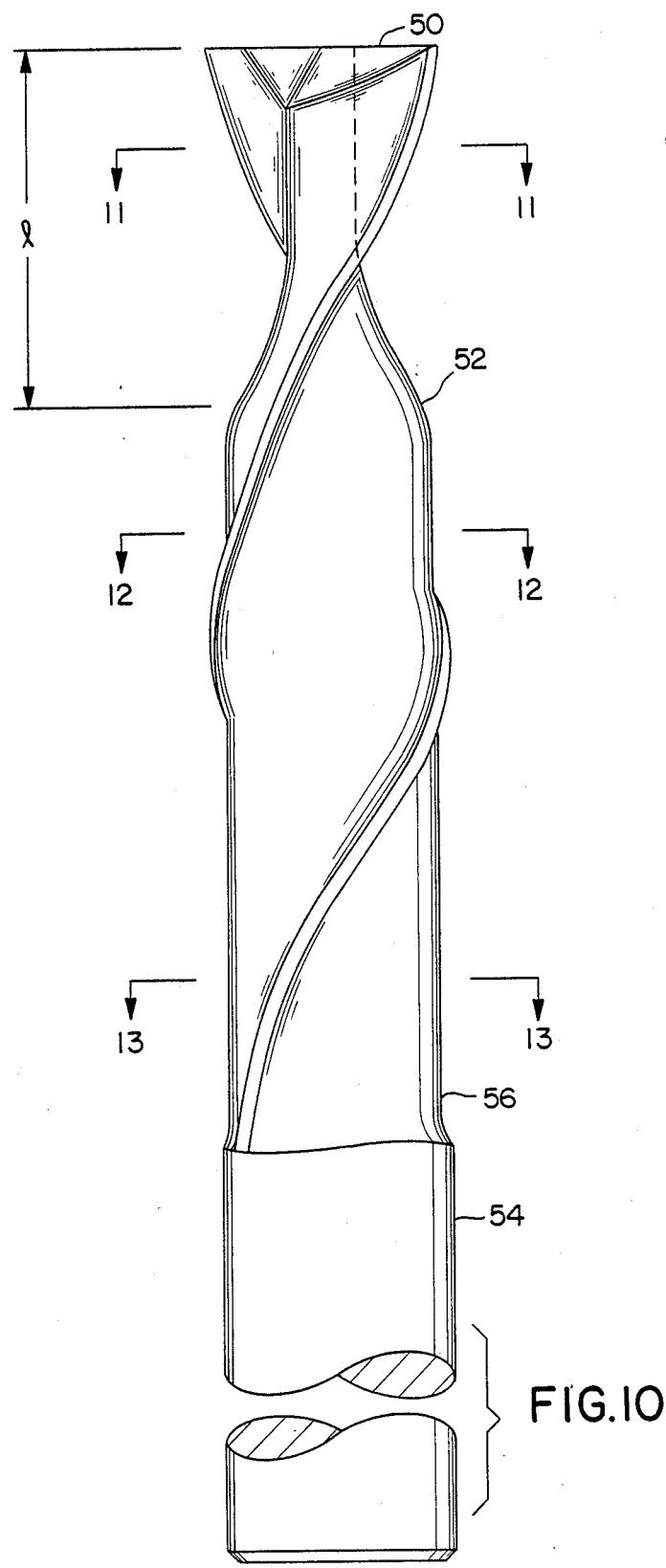
FIG. 10 is a side elevation of an alternative embodiment of the invention.
Figure 11:
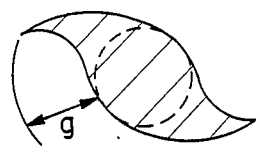
FIG. 11 is a cross-sectional view taken along the line 11—11 in FIG. 10.
Figure 12:
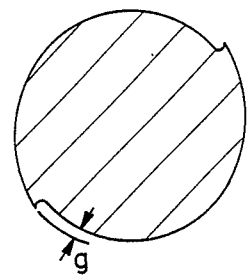
FIG. 12 is a sectional view taken along the line 12—12 of FIG. 10.
Figure 13:
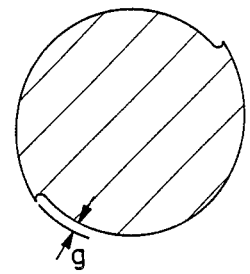
FIG. 13 is a sectional view taken along the line 13—13 in FIG. 10.

The cross-sectional views of FIGS. 11, 12 and 13 are included to assist the reader in perceiving the manner in which the grinding depth, g, varies along the length of the end mill of FIG. 10.

The end mill of the present invention can be made using CNC grinding equipment. Further, the tool may be heat treated or coated with titanium nitride to render it more wear resistant. Various alloys may be employed and a carbide tip on the cutting edge 44 may also be utilized as in conventional end mill configurations.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. An end mill comprising a cylindrical rod having a smooth cylindrical shank portion of circular cross-section and an integrally formed cutting portion with at least one helical flute extending from the transition between said shank portion and said cutting portion to the end of said cutting portion, the depth of grind of said flute being linearly tapered from a minimum depth proximate said transition to a maximum depth proximate said end of said cutting portion.

2. The end mill as in claim 1 wherein said rod is made of high speed tool steel.

3. The end mill as in claim 1 wherein said cutting portion is coated with titanium nitride.

4. The end mill as in claim 2 wherein said steel is an alloy of cobalt.

5. The end mill as in claim 2 wherein said rod is carbide steel.

6. An end mill of the type comprising a steel rod of a predetermined length having a smooth, cylindrical shank portion adapted to be received in a tool holding chuck of a milling machine and a cutting portion extending from the end of said rod, said cutting portion having at least one helical flute extending over the length thereof and terminating in a radial cutting edge, said end mill characterized by having the grinding depth of said helical flute varying linearly along the length of said cutting portion from a maximum depth at said one end to a minimum at a location in said cutting portion displaced from said one end a predetermined distance toward but short of said smooth shank portion.

7. The end mill as in claim 6 wherein said minimum grinding depth is located at the juncture between said cutting portion and said shank portion.

8. The end mill as in claim 6 wherein said minimum grinding depth begins at a location displaced from said one end by a length, 1, which is about one to one and one-half times the diameter of said rod.

* * * * *